US012763244B2

(12) United States Patent
Nagayoshi

(10) Patent No.: US 12,763,244 B2
(45) Date of Patent: Oct. 13, 2026

(54) TRANSFORMER UNIT

(71) Applicant: KABUSHIKI KAISHA TOYOTA JIDOSHOKKI, Kariya (JP)

(72) Inventor: Kenichi Nagayoshi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 770 days.

(21) Appl. No.: 18/034,739

(22) PCT Filed: Nov. 9, 2021

(86) PCT No.: PCT/JP2021/041167
§ 371 (c)(1),
(2) Date: May 1, 2023

(87) PCT Pub. No.: WO2022/102611
PCT Pub. Date: May 19, 2022

(65) Prior Publication Data

US 2023/0402218 A1 Dec. 14, 2023

(30) Foreign Application Priority Data

Nov. 12, 2020 (JP) ................................ 2020-188949

(51) Int. Cl.
*H01F 27/06* (2006.01)
*H01F 27/32* (2006.01)
*H01F 41/08* (2006.01)
*H01F 41/082* (2016.01)

(52) U.S. Cl.
CPC .......... *H01F 27/06* (2013.01); *H01F 27/324* (2013.01); *H01F 41/082* (2016.01)

(58) Field of Classification Search
CPC ....... H01F 27/06; H01F 41/082; H01F 27/324
See application file for complete search history.

(56) References Cited

U.S. PATENT DOCUMENTS

| | | | | |
|---|---|---|---|---|
| 6,522,233 | B1 * | 2/2003 | Kyoso .................. | H01F 27/324 336/200 |
| 2002/0171405 | A1 | 11/2002 | Watanabe | |
| 2004/0027842 | A1 * | 2/2004 | Tanabe ................ | H02M 3/3372 363/133 |

(Continued)

FOREIGN PATENT DOCUMENTS

| | | | |
|---|---|---|---|
| CN | 1479440 | A | 3/2004 |
| JP | H5-166646 | A | 7/1993 |

(Continued)

OTHER PUBLICATIONS

International Search Report for PCT/JP2021/041167 dated Dec. 14, 2021 (PCT/ISA/210).

*Primary Examiner* — Malcolm Barnes
(74) *Attorney, Agent, or Firm* — Sughrue Mion, PLLC

(57) ABSTRACT

A transformer unit includes a primary side coil and a secondary side coil that are disposed to face each other in a winding axis direction. One of the primary side coil and the secondary side coil includes a metal plate winding body. The other of the primary side coil and the secondary side coil includes a first winding and a second winding, which have a greater number of turns than the metal plate winding body. The first winding and the second winding are arranged on opposite sides of the metal plate winding body in a winding axis direction.

4 Claims, 5 Drawing Sheets

(56) References Cited

U.S. PATENT DOCUMENTS

| | | | | |
|---|---|---|---|---|
| 2005/0012541 | A1 | 1/2005 | Watanabe | |
| 2006/0113971 | A1 * | 6/2006 | Watanabe | H02M 7/003<br>257/E29.253 |
| 2016/0055960 | A1 * | 2/2016 | Kaneko | H01F 27/324<br>336/90 |
| 2017/0004920 | A1 * | 1/2017 | Pan | H01F 27/2885 |
| 2019/0269015 | A1 | 8/2019 | Nakazawa | |

FOREIGN PATENT DOCUMENTS

| | | | | |
|---|---|---|---|---|
| JP | 2001-223341 | A | | 8/2001 |
| JP | 2002093634 | A | * | 3/2002 |
| JP | 2003017334 | A | * | 1/2003 |
| JP | 2008-125249 | A | | 5/2008 |
| JP | 2008205210 | A | * | 9/2008 |
| JP | 2019-149443 | A | | 9/2019 |
| WO | 2018/092392 | A1 | | 5/2018 |

* cited by examiner

TRANSFORMER UNIT

CROSS REFERENCE TO RELATED APPLICATIONS

This application is a National Stage of International Application No. PCT/JP2021/041167 filed Nov. 9, 2021, claiming priority based on Japanese Patent Application No. 2020-188949 filed Nov. 12, 2020.

TECHNICAL FIELD

The present disclosure relates to a transformer unit.

BACKGROUND ART

As disclosed in Patent Literature 1, a transformer unit includes a core, a primary side coil, and a secondary side coil. The voltage input to the primary side coil is transformed and output from the secondary side coil.

CITATION LIST

Patent Literature

Patent Literature 1: Japanese Laid-Open Patent Publication No. 2019-149443

SUMMARY OF INVENTION

Technical Problem

When current flows through the primary side coil and the secondary side coil, the current concentrates on portions of the primary side coil and the secondary side coil that are close to each other due to proximity effect. The proximity effect is a phenomenon in which, due to the action of a magnetic field generated by currents flowing through the primary side coil and the secondary side coil, currents flow in a concentrated manner at portions close to each other. When the currents flow in a concentrated manner in portions of the primary side coil and the secondary side coil that are close to each other, the current density locally increases, which leads to an increase in energy loss. In particular, a larger current flows through one of the primary side coil and the secondary side coil that has a smaller number of turns than through the other of the primary side coil and the secondary side coil, which has a greater number of turns. For this reason, the energy loss of one of the primary side coil and the secondary side coil having a smaller number of turns tends to increase.

Solution to Problem

In one general aspect, a transformer unit includes a primary side coil and a secondary side coil that are arranged to face each other in a winding axis direction. One of the primary side coil and the secondary side coil includes a metal plate winding body formed of a wound metal plate. The other of the primary side coil and the secondary side coil includes a first winding and a second winding having a greater number of turns than the metal plate winding body. Each of the metal plate winding body, the first winding, and the second winding is wound around a winding axis extending in the winding axis direction. The first winding and the second winding are disposed on opposite sides of the metal plate winding body in the winding axis direction.

DESCRIPTION OF EMBODIMENT

A transformer unit according to one embodiment will now be described.

Figure 1:
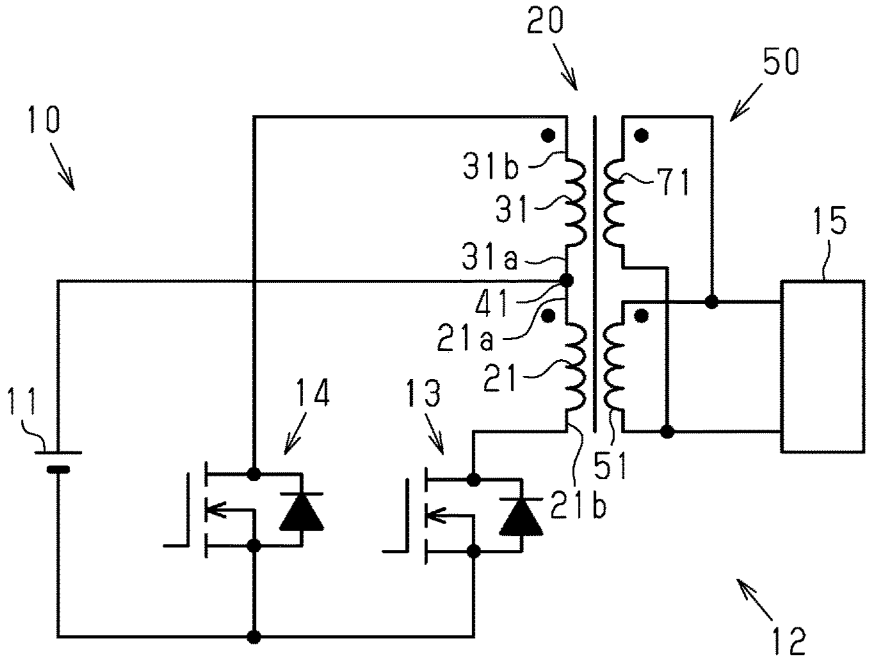
FIG. 1 is a schematic diagram of a power conversion system.

As shown in FIG. 1, a power conversion system 10 includes a DC power supply 11 and a push-pull converter 12.

The DC power supply 11 outputs DC power. The DC power supply 11 includes, for example, a power storage device or a power supply circuit.

The push-pull converter 12 is a push-pull power conversion device that converts the DC power supplied from the DC power supply 11 into DC power having a different voltage. The push-pull converter 12 includes a transformer unit 20, a first switching element 13, a second switching element 14, and a rectifier circuit 15. The transformer unit 20 includes two primary side coils 21, 31, a center tap 41, and a secondary side coil 50. The two primary side coils 21, 31 and the secondary side coil 50 are magnetically coupled to each other.

The primary side coil 21 includes a first end portion 21*a* and a second end portion 21*b*. The primary side coil 31 includes a first end portion 31*a* and a second end portion 31*b*. The primary side coil 21 and the primary side coil 31 are connected in series with the first end portion 21*a* and the first end portion 31*a* being connected to each other.

The center tap 41 is provided at a midpoint between the primary side coil 21 and the primary side coil 31. The center tap 41 is connected to the positive electrode of the DC power supply 11.

The first switching element 13 is provided between the second end portion 21*b* of the primary side coil 21 and the negative electrode of the DC power supply 11. The second switching element 14 is provided between the second end portion 31*b* of the primary side coil 31 and the negative electrode of the DC power supply 11. Each of the switching elements 13, 14 is, for example, a semiconductor switching element.

The secondary side coil 50 includes a first winding 51 and a second winding 71. The first winding 51 and the second winding 71 are connected in parallel to each other.

The rectifier circuit 15 is connected to the secondary side coil 50. The rectifier circuit 15 converts AC power output from the secondary side coil 50 into DC power. The rectifier circuit 15 includes, for example, a bridge circuit using diodes. The DC power output from the rectifier circuit 15 is supplied to a load.

In the push-pull converter 12, the first switching element 13 and the second switching element 14 are turned on alternately. In other words, current flows alternately through the two primary side coils 21, 31. When the first switching element 13 is turned on, a voltage is applied to the primary side coil 21. As a result, an induced current flows through the secondary side coil 50. When the second switching element 14 is turned on, a voltage is applied to the primary side coil 31. As a result, an induced current flows through the secondary side coil 50. The induced current that flows through the secondary side coil 50 when a voltage is applied to the primary side coil 21 and the induced current that flows through the secondary side coil 50 when a voltage is applied to the primary side coil 31 flow in opposite directions.

The transformer unit 20 of the present embodiment steps up a voltage in accordance with the turns ratio between the primary side coils 21, 31 and the secondary side coil 50. The power input to the primary side coils 21, 31 is stepped up in voltage and output from the secondary side coil 50. Through step-up in the transformer unit 20, the voltage increases while the current decreases in the secondary side coil 50. The current flowing through the primary side coil 21, 31 is greater than the current flowing through the secondary side coil 50.

Next, the structure of the transformer unit 20 will be described.

Figure 2:
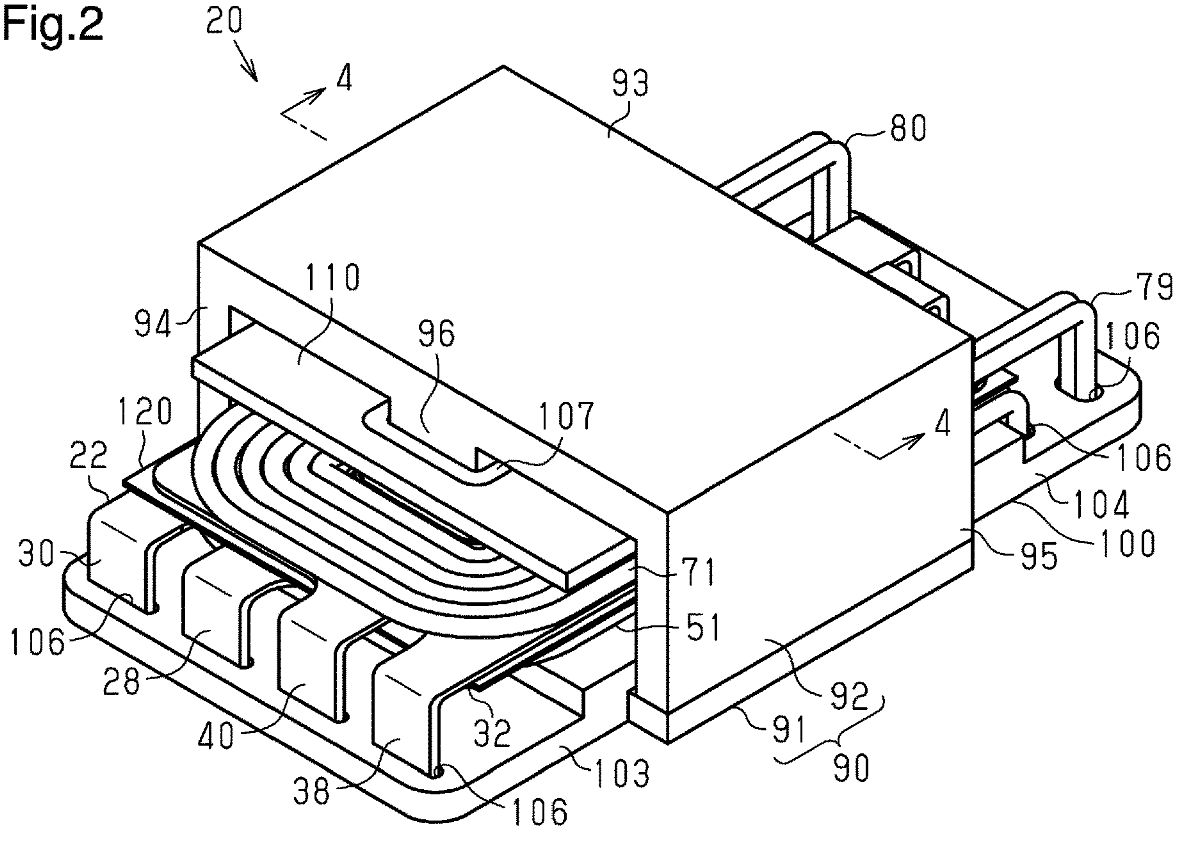
FIG. 2 is a perspective view of a transformer unit of the power conversion system shown in FIG. 1.
Figure 3:
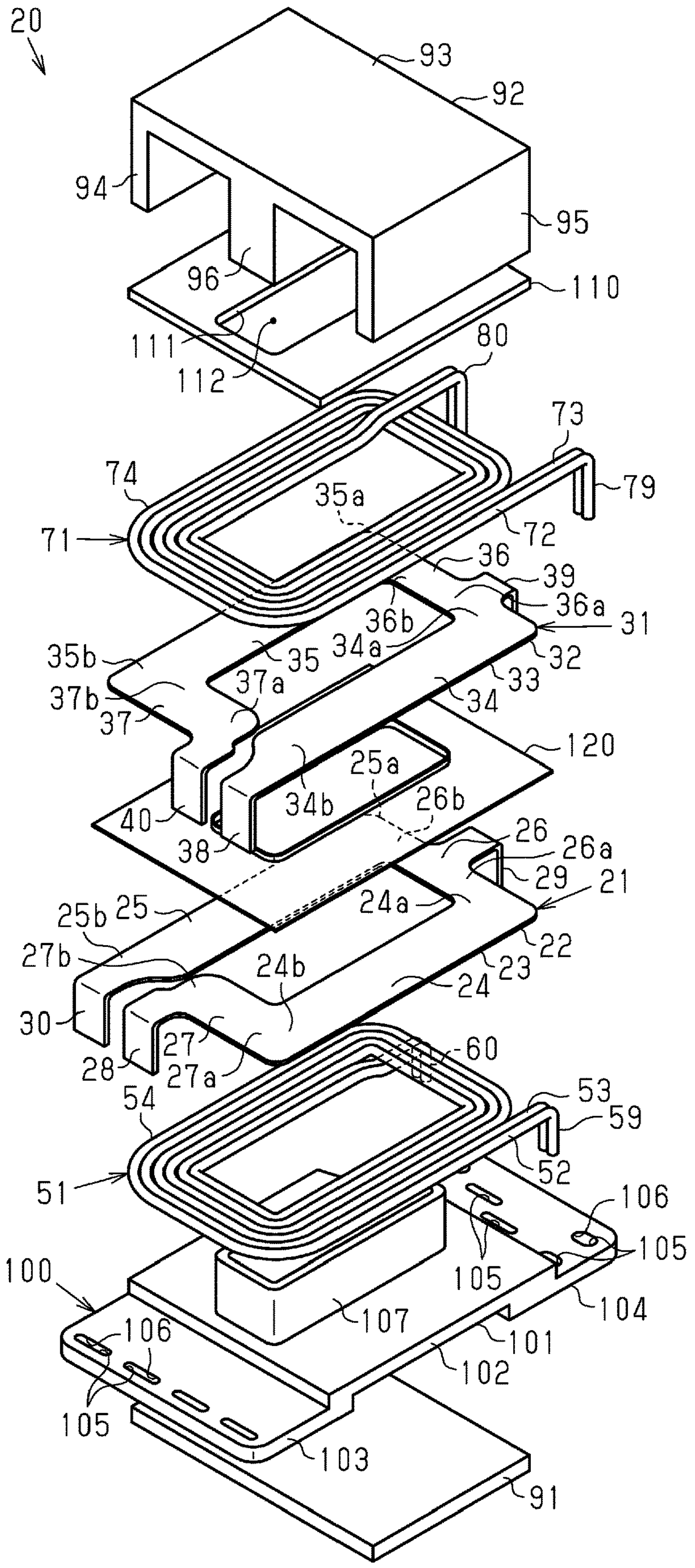
FIG. 3 is an exploded perspective view of the transformer unit shown in FIG. 2.

As shown in FIGS. 2 and 3, the primary side coil 21 includes one metal plate winding body 22 formed of a wound rectangular metal plate. As the metal plate, a copper plate or an aluminum plate can be used. In the present embodiment, the number of turns of the metal plate winding body 22 is one. The number of turns of the metal plate winding body 22 can also be referred to as the number of turns of the primary side coil 21. Since the current flowing through the primary side coil 21 is greater than the current flowing through the secondary side coil 50, the energy loss is reduced by using the metal plate winding body 22.

Figure 4:
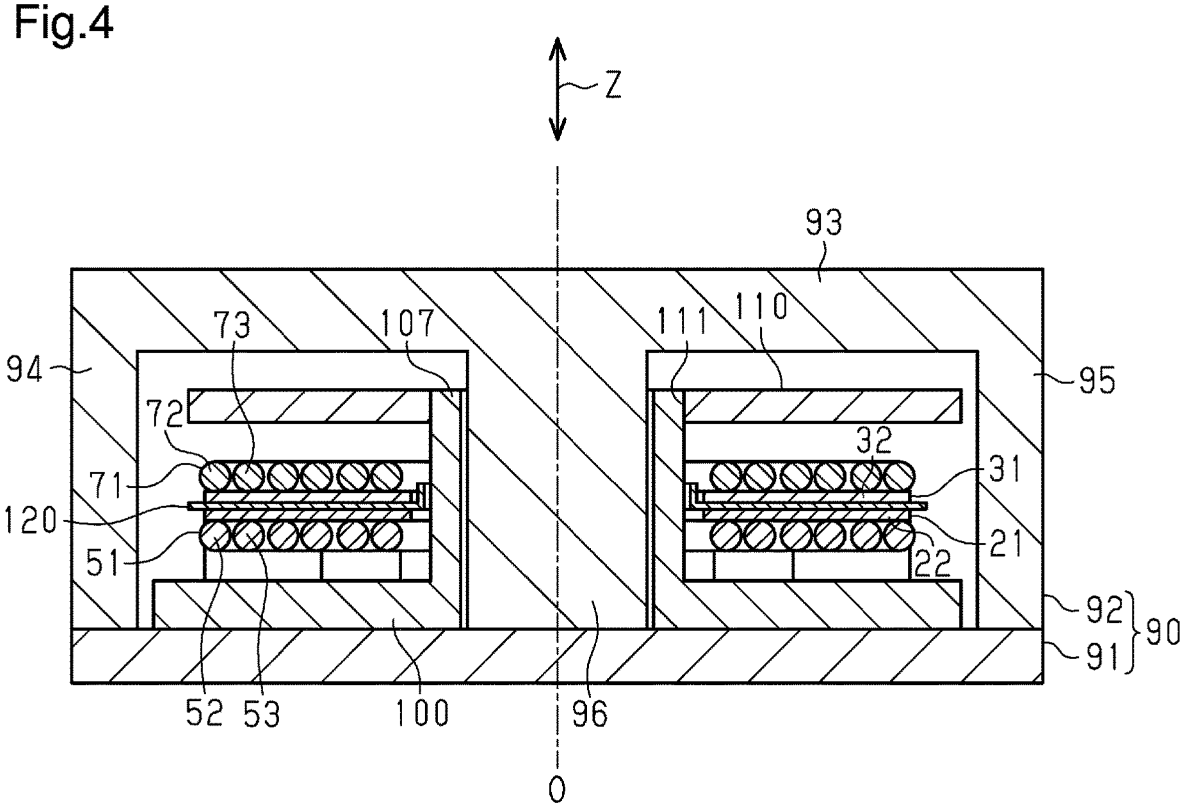
FIG. 4 is a cross-sectional view taken along line 4-4 of FIG. 2, showing a cross-sectional view of the transformer unit.

The metal plate winding body 22 includes a metal plate winding portion 23 made of a wound metal plate, and three metal plate terminal portions 28, 29, 30. The metal plate winding portion 23 includes a first metal plate long side portion 24 having a rectangular shape, a second metal plate long side portion 25 having a rectangular shape, a first metal plate short side portion 26 having a rectangular shape, and a second metal plate short side portion 27 having a rectangular shape. The metal plate winding portion 23 is obtained by winding the metal plate such that the thickness direction of the metal plate is the same as a winding axis direction Z (FIG. 4). The metal plate long side portions 24, 25 each have a longer dimension in the direction in which the metal plate extends (dimension in the longitudinal direction) than the metal plate short side portions 26, 27.

The first metal plate long side portion 24 includes a first end portion **24*a* and a second end portion 24*b*. The first end portion 24*a* and the second end portion 24*b* are end portions in the longitudinal direction of the first metal plate long side portion 24. In other words, the first end portion 24*a* and the second end portion 24*b* are end portions spaced apart from each other in the direction in which the first metal plate long side portion 24 extends, that is, in the longitudinal direction of the first metal plate long side portion 24**.

The second metal plate long side portion 25 includes a first end portion **25*a* and a second end portion 25*b*. The first end portion 25*a* and the second end portion 25*b* are end portions in the longitudinal direction of the second metal plate long side portion 25. In other words, the first end portion 25*a* and the second end portion 25*b* are end portions spaced apart from each other in the direction in which the second metal plate long side portion 25 extends, that is, in the longitudinal direction of the second metal plate long side portion 25**.

The first metal plate long side portion 24 and the second metal plate long side portion 25 are disposed to be spaced apart from each other in the transverse direction of the first metal plate long side portion 24, that is, in the transverse direction of the second metal plate long side portion 25.

The first metal plate short side portion 26 includes a first end portion **26*a* and a second end portion 26*b*. The first end portion 26*a* and the second end portion 26*b* are end portions in the longitudinal direction of the first metal plate short side portion 26. In other words, the first end portion 26*a* and the second end portion 26*b* are end portions spaced apart from each other in the direction in which the first metal plate short side portion 26 extends, that is, in the longitudinal direction of the first metal plate short side portion 26**.

The second metal plate short side portion 27 includes a first end portion **27*a* and a second end portion 27*b*. The first end portion 27*a* and the second end portion 27*b* are end portions of the second metal plate short side portion 27 in the longitudinal direction. In other words, the first end portion 27*a* and the second end portion 27*b* are end portions spaced apart from each other in the direction in which the second metal plate short side portion 27 extends, that is, in the longitudinal direction of the second metal plate short side portion 27**.

The first metal plate short side portion 26 and the second metal plate short side portion 27 are disposed to be spaced apart from each other in the transverse direction of the first metal plate short side portion 26, that is, in the transverse direction of the second metal plate short side portion 27.

The first end portion **26*a* of the first metal plate short side portion 26 is connected to the first end portion 24*a* of the first metal plate long side portion 24. The second end portion 26*b* of the first metal plate short side portion 26 is connected to the first end portion 25*a* of the second metal plate long side portion 25**.

The first end portion **27*a* of the second metal plate short side portion 27 is connected to the second end portion 24*b* of the first metal plate long side portion 24. The second metal plate short side portion 27 extends from the second end portion 24*b* of the first metal plate long side portion 24 toward the second end portion 25*b* of the second metal plate long side portion 25, but the second end portion 27*b* is not connected to the second end portion 25*b*. Accordingly, a gap is formed between the second end portion 27*b* of the second metal plate short side portion 27 and the second end portion 25*b* of the second metal plate long side portion 25**.

The metal plate terminal portions 28, 29, 30 are L-shaped. One end of each of the metal plate terminal portions 28, 29, 30 is connected to the metal plate winding portion 23. The metal plate terminal portions 28, 29, 30 extend from the metal plate winding portion 23 in the direction in which the first metal plate long side portion 24 extends, that is, in the longitudinal direction of the first metal plate long side portion 24, and then bend and extend in the winding axis direction of the metal plate winding body 22. One end of the metal plate terminal portion 28 is provided at the second end portion 27*b* of the second metal plate short side portion 27. One end of the metal plate terminal portion 29 is provided in a section of the first metal plate short side portion 26 between the first metal plate long side portion 24 and the second metal plate long side portion 25. One end of the metal plate terminal portion 30 is provided at the second end portion 25*b* of the second metal plate long side portion 25.

The primary side coil 31 includes a metal plate winding body 32. Similarly to the metal plate winding body 22, the metal plate winding body 32 is formed by winding a rectangular metal plate. The number of turns of the metal plate winding body 32 is the same as the number of turns of the metal plate winding body 22. In this embodiment, the number of turns of the metal plate winding body 32 is one. The number of turns of the metal plate winding body 32 can also be referred to as the number of turns of the primary side coil 31. Since the current flowing through the primary side coil 31 is greater than the current flowing through the secondary side coil 50, the energy loss is reduced by using the metal plate winding body 32.

The metal plate winding body 32 includes a metal plate winding portion 33 made of a wound metal plate, and three metal plate terminal portions 38, 39, 40. The metal plate winding portion 33 includes a first metal plate long side portion 34 having a rectangular shape, a second metal plate long side portion 35 having a rectangular shape, a first metal plate short side portion 36 having a rectangular shape, and a second metal plate short side portion 37 having a rectangular shape.

The first metal plate long side portion 34 and the second metal plate long side portion 25 have the same dimension in the longitudinal direction and the same dimension in the transverse direction. The second metal plate long side portion 35 and the first metal plate long side portion 24 have the same dimension in the longitudinal direction and the same dimension in the transverse direction. The first metal plate short side portion 36 and the first metal plate short side portion 26 have the same dimension in the longitudinal direction and the same dimension in the transverse direction. The second metal plate short side portion 37 and the second metal plate short side portion 27 have the same dimension in the longitudinal direction and the same dimension in the transverse direction. A state in which two "dimensions are the same" allows error within tolerances.

The first metal plate long side portion 34 includes a first end portion 34*a* and a second end portion 34*b*. The first end portion 34*a* and the second end portion 34*b* are end portions in the longitudinal direction of the first metal plate long side portion 34. In other words, the first end portion 34*a* and the second end portion 34*b* are end portions spaced apart from each other in the direction in which the first metal plate long side portion 34 extends, that is, in the longitudinal direction of the first metal plate long side portion 34.

The second metal plate long side portion 35 includes a first end portion 35*a* and a second end portion 35*b*. The first end portion 35*a* and the second end portion 35*b* are end portions in the longitudinal direction of the second metal plate long side portion 35. In other words, the first end portion 35*a* and the second end portion 35*b* are end portions spaced apart from each other in the direction in which the second metal plate long side portion 35 extends, that is, in the longitudinal direction of the second metal plate long side portion 35.

The first metal plate long side portion 34 and the second metal plate long side portion 35 are disposed to be spaced apart from each other in the transverse direction of the first metal plate long side portion 34, that is, in the transverse direction of the second metal plate long side portion 35.

The first metal plate short side portion 36 includes a first end portion 36*a* and a second end portion 36*b*. The first end portion 36*a* and the second end portion 36*b* are end portions in the longitudinal direction of the first metal plate short side portion 36. In other words, the first end portion 36*a* and the second end portion 36*b* are end portions spaced apart from each other in the direction in which the first metal plate short side portion 36 extends, that is, in the longitudinal direction of the first metal plate short side portion 36.

The second metal plate short side portion 37 includes a first end portion 37*a* and a second end portion 37*b*. The first end portion 37*a* and the second end portion 37*b* are end portions in the longitudinal direction of the second metal plate short side portion 37. In other words, the first end portion 37*a* and the second end portion 37*b* are end portions spaced apart from each other in the direction in which the second metal plate short side portion 37 extends, that is, in the longitudinal direction of the second metal plate short side portion 37.

The first metal plate short side portion 36 and the second metal plate short side portion 37 are disposed to be spaced apart from each other in the transverse direction of the first metal plate short side portion 36, that is, in the transverse direction of the second metal plate short side portion 37.

The first end portion 36*a* of the first metal plate short side portion 36 is connected to the first end portion 34*a* of the first metal plate long side portion 34. The second end portion 36*b* of the first metal plate short side portion 36 is connected to the first end portion of the second metal plate long side portion 35.

The second end portion 37*b* of the second metal plate short side portion 37 is connected to the second end portion 35*b* of the second metal plate long side portion 35. The second metal plate short side portion 37 extends from the second end portion 35*b* of the second metal plate long side portion 35 toward the second end portion 34*b* of the first metal plate long side portion 34, but the first end portion 37*a* is not connected to the second end portion 34*b*. Accordingly, a gap is formed between the first end portion 37*a* of the second metal plate short side portion 37 and the second end portion 34*b* of the first metal plate long side portion 34.

The metal plate terminal portions 38, 39, 40 are L-shaped. One end of each of the metal plate terminal portions 38, 39, 40 is connected to the metal plate winding portion 33. The metal plate terminal portions 38, 39, 40 extend from the metal plate winding portion 33 in the direction in which the first metal plate long side portion 34 extends, that is, in the longitudinal direction of the first metal plate long side portion 34, and then bend and extend in the winding axis direction Z of the metal plate winding body 32. One end of the metal plate terminal portion 38 is provided at the second end portion 34*b* of the first metal plate long side portion 34. One end of the metal plate terminal portion 39 is provided in a section of the first metal plate short side portion 36 between the first metal plate long side portion 34 and the second metal plate long side portion 35. One end of the metal plate terminal portion 40 is provided at the first end portion 37*a* of the second metal plate short side portion 37.

The first winding 51 includes windings 52, 53. In the present embodiment, the first winding 51 includes two windings 52, 53. The windings 52, 53 are connected in parallel to each other. The windings 52, 53 are insulated windings. An insulated winding is obtained by insulating a linear conductor with an insulating layer, and includes, for example, a magnet wire. An insulated winding includes a single wire as the conductor. The number of turns of the two windings 52, 53 is the same. In the present embodiment, the number of turns of the windings 52, 53 is three. The number of turns of the windings 52, 53 is greater than the number of turns of the metal plate winding bodies 22, 32. The number of turns of the windings 52, 53 is the number of turns of the first winding 51.

The two windings 52, 53 are wound while being arranged side by side with each other. The windings 52, 53 are wound such that the windings 52, 53 are arranged in a direction intersecting with the winding axis direction Z. In the present embodiment, the windings 52, 53 are wound such that the windings 52, 53 are arranged in a direction orthogonal to the winding axis direction Z. In other words, the windings 52, 53 are wound such that the area of the first winding 51 viewed from the winding axis direction Z increases as the number of turns increases. In the present embodiment, the two windings 52, 53 are wound into a rectangular frame shape. The first winding 51 includes a winding portion 54, in which the windings 52, 53 are wound, and two terminal portions 59, 60.

The terminal portions 59, 60 are L-shaped. The terminal portions 59, 60 are connected to the winding portion 54. The terminal portions 59, 60 extend away from the winding portion 54 and then bend to extend in the winding axis direction Z of the first winding 51.

The second winding 71 has a structure similar to that of the first winding 51. More specifically, the second winding 71 includes windings 72, 73 that are wound in the same manner as the first winding 51. The windings 72, 73 are connected in parallel to each other. The number of turns of the windings 72, 73 is the same as the number of turns of the windings 52, 53. In the present embodiment, the number of turns of the windings 72, 73 is three. The number of turns of the windings 72, 73 is greater than the number of turns of the metal plate winding bodies 22, 32. The number of turns of the windings 72, 73 is the number of turns of the second winding 71. In the present embodiment, since the first winding 51 and the second winding 71 are connected in parallel to each other, the number of turns of the first winding 51 and the number of turns of the second winding 71 are the number of turns of the secondary side coil 50.

The second winding 71 includes a winding portion 74, in which the windings 72, 73 are wound, and two terminal portions 79, 80.

The terminal portions 79, 80 are L-shaped. The terminal portions 79, 80 are connected to the winding portion 74. The terminal portions 79, 80 extend away from the winding portion 74 and then bend to extend in the winding axis direction Z of the second winding 71.

The dimensions of the metal plate winding bodies 22, 32 in the thickness direction are shorter than the diameters of the windings 52, 53, 72, 73.

The transformer unit 20 includes a core 90, a first case 100, a second case 110, and an insulating plate 120.

The core 90 is an EI core. The core 90 includes a first core 91 and a second core 92. The first core 91 is an I core. The first core 91 has a flat plate shape. The second core 92 is an E core. The second core 92 includes a flat plate-shaped base portion 93 and three protruding portions 94, 95, 96 protruding from the base portion 93. The three protruding portions 94, 95, 96 protrude from the base portion 93 in the thickness direction of the base portion 93. The three protruding portions 94, 95, 96 are provided side by side at intervals.

The first case 100 includes a base portion 101 and a tubular portion 107. The base portion 101 includes a flat plate-shaped central portion 102, a flat plate-shaped first edge portion 103, and a flat plate-shaped second edge portion 104. The first edge portion 103 and the second edge portion 104 are located on opposite sides of the central portion 102. In the present embodiment, the base portion 101 has a rectangular plate shape. The first edge portion 103 and the second edge portion 104 are provided on opposite sides of the base portion 101 in the longitudinal direction of the base portion 101. Each of the two edge portions 103, 104 includes annular defining surfaces 105 extending between opposite surfaces of the edge portions 103, 104 in the thickness direction of the edge portions 103, 104. Each region surrounded by one of the defining surfaces 105 is a through-hole 106 extending through the edge portion 103, 104. The tubular portion 107 protrudes from the base portion 101 in the thickness direction of the base portion 101. The tubular portion 107 is provided in the central portion 102.

The second case 110 has a plate shape. The second case 110 includes a defining surface 111 extending between opposite surfaces of the second case 110 in the thickness direction. The defining surface 111 is a rectangular frame-shaped surface. A region surrounded by the defining surface 111 is a quadrangular through-hole 112.

The insulating plate 120 is configured to insulate the two metal plate winding bodies 22, 32 from each other. As the insulating plate 120, for example, insulating paper is used. The insulating plate 120 of the present embodiment has a rectangular frame shape.

As shown in FIGS. 3 and 4, the first core 91, the first case 100, the first winding 51, the metal plate winding body 22, the insulating plate 120, the metal plate winding body 32, the second winding 71, the second case 110, and the second core 92 are stacked in that order. A direction in which the first winding 51, the metal plate winding body 22, the metal plate winding body 32, and the second winding 71 are stacked is defined as a height direction.

The metal plate winding body 22 is disposed such that the winding axis direction Z of the metal plate winding body 22 agrees with the height direction. End portions of the metal plate terminal portions 28, 29, 30 are inserted into the through-holes 106 of the first case 100. The metal plate winding body 32 is disposed such that the winding axis direction Z of the metal plate winding body 32 agrees with the height direction. End portions of the metal plate terminal portions 38, 39, 40 are inserted into the through-holes 106 of the first case 100. The first winding 51 is disposed such that the winding axis direction Z of the first winding 51 agrees with the height direction. An end portion of the terminal portion 59 and an end portion of the terminal portion 60 are inserted into the through-holes 106 of the first case 100. The second winding 71 is disposed such that the winding axis direction Z of the second winding 71 agrees with the height direction. An end portion of the terminal portion 79 and an end portion of the terminal portion 80 are inserted into the through-holes 106 of the first case 100. The insulating plate 120 is disposed such that the thickness direction and the height direction agree with each other.

The winding axis direction Z of the metal plate winding body 22, the winding axis direction Z of the first winding 51, and the winding axis direction Z of the second winding 71 agree with each other. In the following description, the winding axis direction Z of the metal plate winding body 22, the winding axis direction Z of the first winding 51, and the winding axis direction Z of the second winding 71 are referred to as winding axis direction Z. The metal plate winding body 22, the first winding 51, and the second winding 71 are wound around a winding axis O extending in the winding axis direction Z.

The primary side coils 21, 31 and the secondary side coil 50 are disposed to face each other. The metal plate winding body 22 and the first winding 51 face each other in the winding axis direction Z. The metal plate winding body 22 and the first winding 51 are in contact with each other.

The first winding 51 faces each of the first metal plate long side portion 24, the second metal plate long side portion 25, the first metal plate short side portion 26, and the second metal plate short side portion 27 of the metal plate winding body 22. In a section of the first winding 51 that faces the first metal plate long side portion 24, the windings 52, 53 are arranged side by side in the transverse direction of the first metal plate long side portion 24. In a section of the first winding 51 that faces the second metal plate long side portion the windings 52, 53 are arranged side by side in the transverse direction of the second metal plate long side portion 25. In a section of the first winding 51 that faces the first metal plate short side portion 26, the windings 52, 53 are arranged side by side in the transverse direction of the first metal plate short side portion 26. In a section of the first winding 51 that faces the second metal plate short side portion 27, the windings 52, 53 are arranged side by side in the transverse direction of the second metal plate short side portion 27.

The metal plate winding body 32 and the second winding 71 face each other in the winding axis direction Z. The metal plate winding body 32 and the second winding 71 are in contact with each other.

The second winding 71 faces each of the first metal plate long side portion 34, the second metal plate long side portion 35, the first metal plate short side portion 36, and the second metal plate short side portion 37 of the metal plate winding body 32. In a section of the second winding 71 that faces the first metal plate long side portion 34, the windings 72, 73 are arranged side by side in the transverse direction of the first metal plate long side portion 34. In a section of the second winding 71 that faces the second metal plate long side portion 35, the windings 72, 73 are arranged side by side in the transverse direction of the second metal plate long side portion 35. In a section of the second winding 71 that faces the first metal plate short side portion 36, the windings 72, 73 are arranged side by side in the transverse direction of the first metal plate short side portion 36. In a section of the second winding 71 that faces the second metal plate short side portion 37, the windings 72, 73 are arranged side by side in the transverse direction of the second metal plate short side portion 37.

As described above, the two metal plate winding bodies 22, 32 are disposed between the first winding 51 and the second winding 71. The first winding 51 and the second winding 71 are disposed on opposite sides the two metal plate winding bodies 22, 32 in the winding axis direction Z.

The insulating plate 120 is located between the two metal plate winding bodies 22, 32. The two metal plate winding bodies 22, 32 are in contact with the insulating plate 120. The two metal plate winding bodies 22, 32 face each other with the insulating plate 120 between them. The two first metal plate long side portions 24, 34, the two second metal plate long side portions 25, 35, the two first metal plate short side portions 26, 36, and the two second metal plate short side portions 27, 37 respectively face each other in the winding axis direction Z with the insulating plate 120 between them. The distance between the two metal plate winding bodies 22, 32 is smaller than the diameters of the windings 52, 53, 72, 73.

The tubular portion 107 of the first case 100 is inserted into a region surrounded by the first winding 51, a region surrounded by the metal plate winding body 22, a region surrounded by the insulating plate 120, a region surrounded by the metal plate winding body 32, and a region surrounded by the second winding 71. In other words, the first winding 51, the metal plate winding body 22, the insulating plate 120, the metal plate winding body 32, and the second winding 71 are arranged to surround the tubular portion 107. The second case 110 is disposed such that the tubular portion 107 is inserted into the through-hole 112.

The protruding portion 96 of the second core 92 is inserted into the tubular portion 107 via the through-hole 112. Thus, a part of the core 90 is inserted into the first winding 51, the second winding 71, the metal plate winding body 22, and the metal plate winding body 32.

End portions of the terminal portions 59, 60, end portions of the terminal portions 79, 80, end portions of the metal plate terminal portions 28, 29, 30, and end portions of the metal plate terminal portions 38, 39, 40 extend through the through-holes 106 of the first case 100 and protrude to the outside of the through-holes 106. The transformer unit 20 is mounted on a substrate by bonding the end portions of the terminal portions 59, 60, the end portions of the terminal portions 79, 80, the end portions of the metal plate terminal portions 28, 29, 30, and the end portions of the metal plate terminal portions 38, 39, 40 to the substrate.

Operation of the present embodiment will now be described.

When current flows through the primary side coil 21 and the secondary side coil 50, current flows through both the first winding 51 and the second winding 71. The magnetic field generated by the current flowing through the first winding 51 acts such that the current density becomes higher at a position closer to the first winding 51 in the metal plate winding bodies 22, 32. The magnetic field generated by the current flowing through the second winding 71 acts such that the current density becomes higher at a position closer to the second winding 71 in the metal plate winding bodies 22, 32. When proximity effect occurs on the opposite sides of the metal plate winding bodies 22, 32 in the winding axis direction Z, it is possible to prevent the current density in the metal plate winding bodies 22, 32 from locally increasing.

Hereinafter, the current density in the metal plate winding bodies 22, 32 will be described with reference to FIGS. 5 to 8. In FIGS. 5 to 8, the current density when current flows through the metal plate winding body 32 of the two metal plate winding bodies 22, 32 will be described. The same description applies to the current density when current flows through the metal plate winding body 22. In FIGS. 5 to 8, the current density in the metal plate winding body 32 is expressed by the density of dots. The higher the current density in the metal plate winding body 32 is, the higher the dot density becomes.

Figure 5:
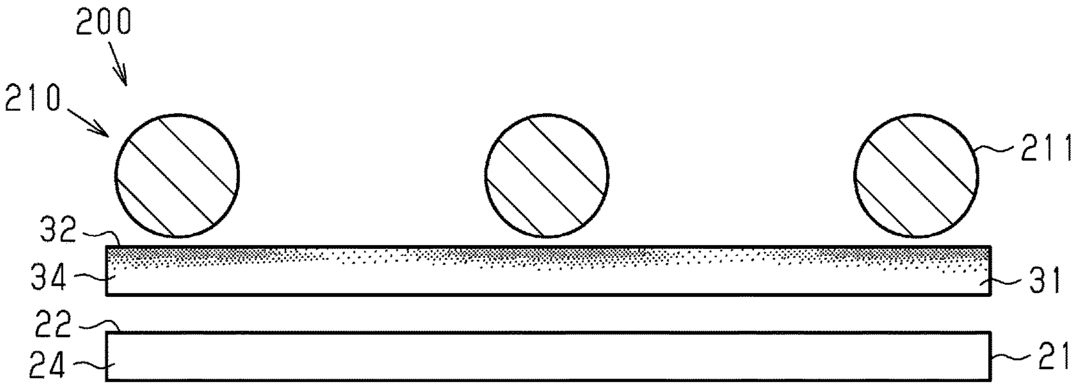
FIG. 5 is a diagram showing a current density in a metal plate winding body when a secondary side coil is a single winding.

FIG. 5 shows a secondary side coil 210 of a transformer unit 200 according to a comparative example. The secondary side coil 210 includes a single winding 211. The winding 211 is wound. The number of turns of the winding 211 is three. Spaces are interposed between different sections of the winding 211. The winding 211 is disposed to face the metal plate winding body 32. Since spaces are interposed between different sections of the windings 211, the facing area, in which the winding 211 and the metal plate winding body 32 face each other in the winding axis direction Z, is smaller than that in the transformer unit 20 of the present embodiment.

When current flows through the winding 211, a section of the metal plate winding body 32 closer to the winding 211 has a higher current density due to the proximity effect. In the transformer unit 200 of the comparative example, the current density increases toward the surface closer to the winding 211 of the opposite surfaces in the winding axis direction Z of the metal plate winding body 32. Further, in the transformer unit 200 of the comparative example, the current density in the section not facing the winding 211 is relatively low. Therefore, in the transformer unit 200 of the comparative example, the current density in the metal plate winding body 32 is likely to be uneven both in the winding axis direction Z and the direction in which the sections of the winding 211 are arranged.

Figure 6:
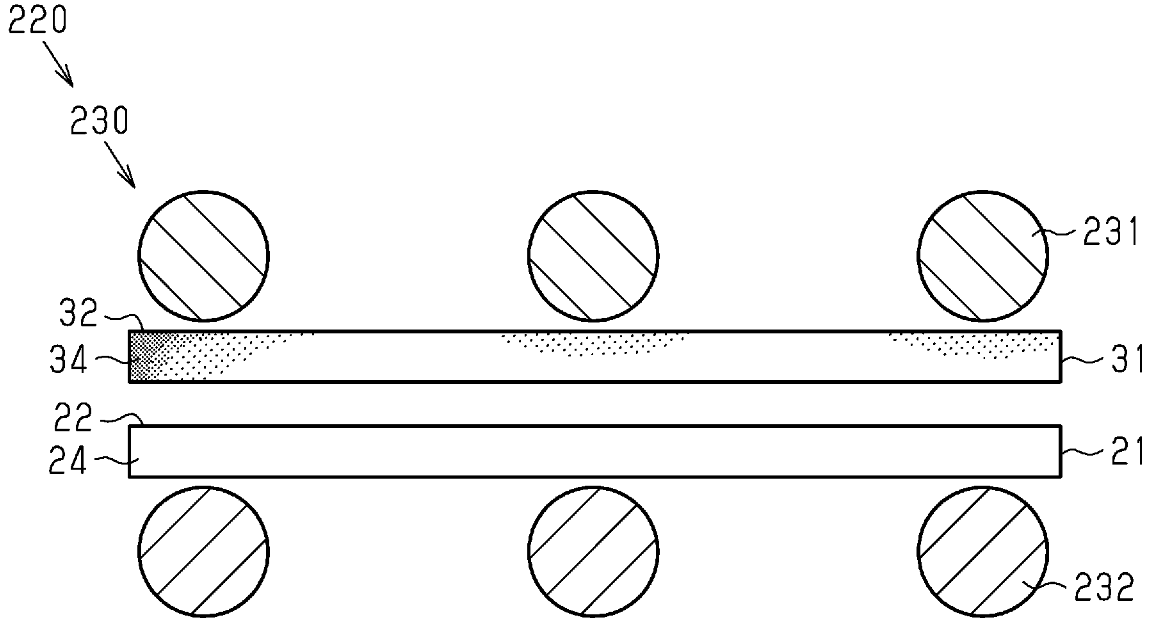
FIG. 6 is a diagram showing a current density in a metal plate winding body when a first winding and a second winding are disposed on opposite sides of the metal plate winding body.

In a transformer unit 220 shown in FIG. 6, a secondary side coil 230 includes a first winding 231 and a second winding 232. The first winding 231 and the second winding 232 are similar to the winding 211. The first winding 231 and the second winding 232 are arranged on opposite sides of the two metal plate winding bodies 22, 32 in the winding axis direction Z. That is, the transformer unit 220 shown in FIG. 6 is obtained by reducing the number of windings included in the first winding 51 and the second winding 71 from the transformer unit 20 of the embodiment.

Since the metal plate winding bodies 22, 32 are located between the first winding 231 and the second winding 232, both the proximity effect by the first winding 231 and the proximity effect by the second winding 232 act on the metal plate winding bodies 22, 32. As a result, unevenness of the current density with respect to the winding axis direction Z is reduced as compared with the transformer unit 200 of the comparative example shown in FIG. 5.

Figure 7:
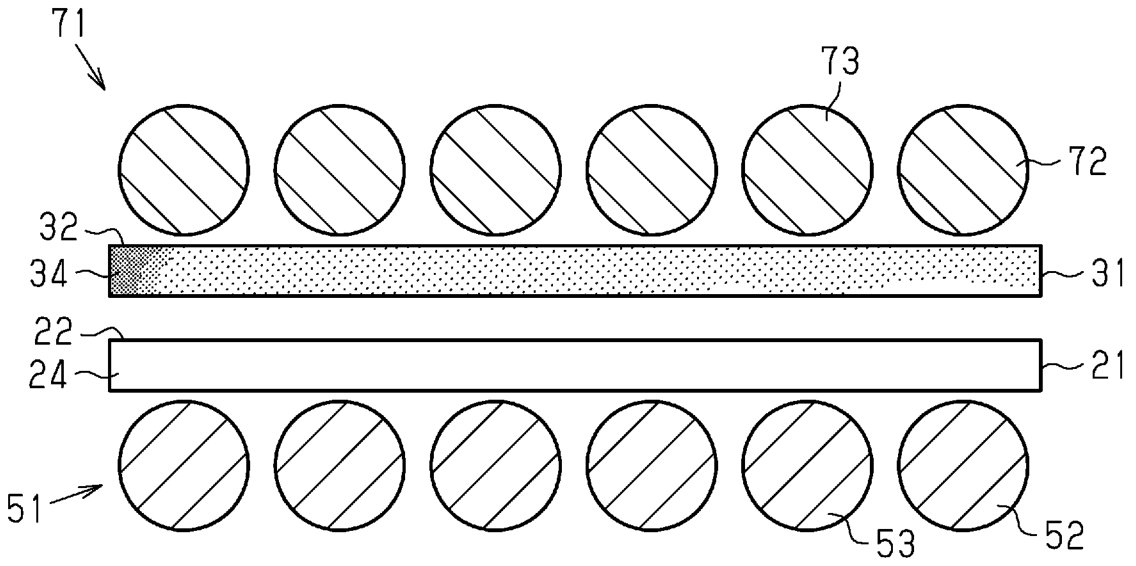
FIG. 7 is a diagram showing a current density in the metal plate winding body in the transformer unit shown in FIG. 2.

As shown in FIG. 7, in the transformer unit 20 of the embodiment, the first winding 51 and the second winding 71 respectively include the windings 52, 53 and the windings 72, 73. Thus, the facing area is increased as compared with the transformer unit 220 shown in FIG. 6, while maintaining the number of turns of the first winding 51 and the second winding 71.

Since the facing area is increased to reduce sections in the metal plate winding bodies 22, 32 that do not face the first winding 51 and the second winding 71, unevenness of the current density with respect to the direction in which the windings 52, 53, 72, 73 are arranged in the metal plate winding bodies 22, 32 is reduced. The transformer unit 20 according to the embodiment thus reduces the unevenness of the current density in both the winding axis direction Z and the direction in which the windings 52, 53, 72, 73 are arranged.

Figure 8:
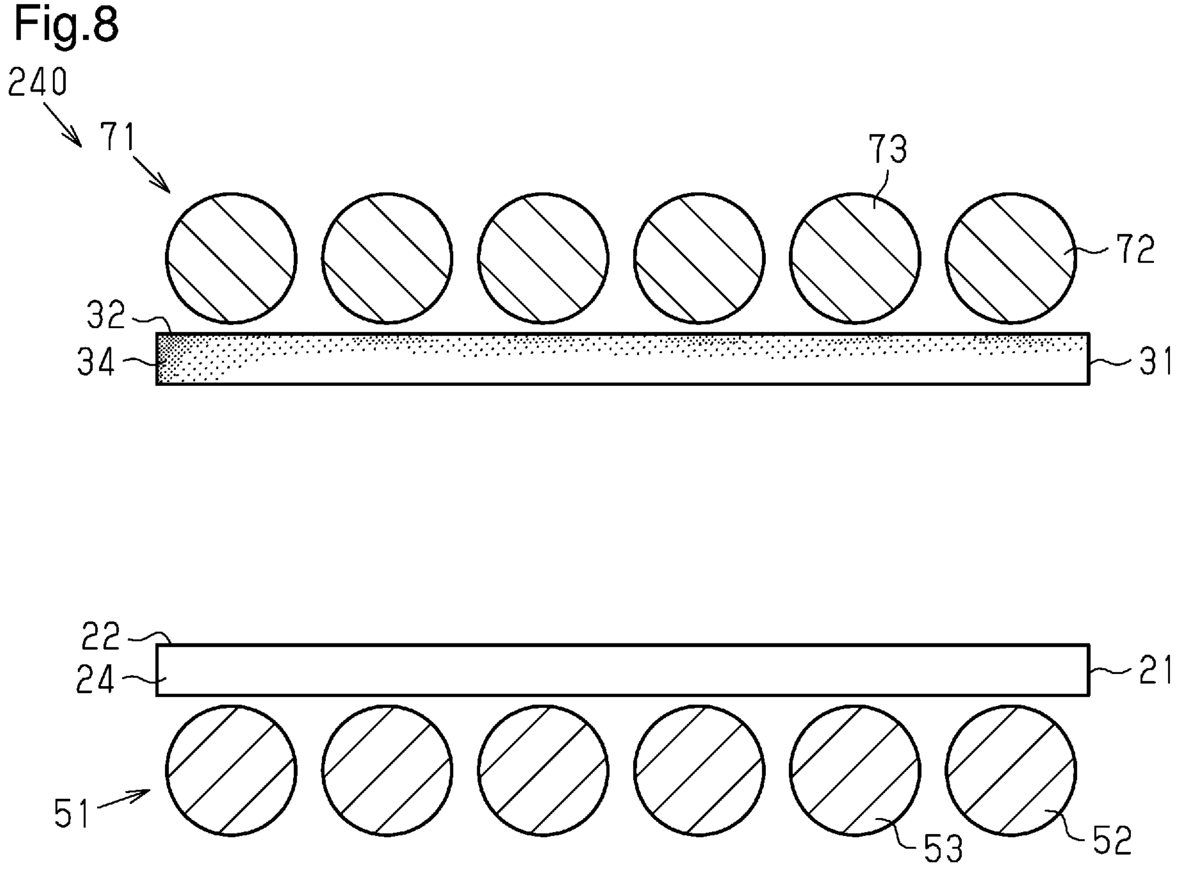
FIG. 8 is a diagram showing current densities in the metal plate winding bodies when the distance between the two metal plate winding bodies is relatively long.

In a transformer unit 240 shown in FIG. 8, the distance between the two metal plate winding bodies 22, 32 is longer than that in the transformer unit 20 of the embodiment. When the distance between the two metal plate winding bodies 22, 32 is increased, the magnetic field of the first winding 51 is less likely to act on the metal plate winding body 32, and the proximity effect caused by the current flowing through the second winding 71 greatly acts on the metal plate winding body 32. Similarly, the proximity effect caused by the current flowing through the first winding 51 greatly acts on the metal plate winding body 22. Thus, as compared with the transformer unit 20 of the embodiment, the current density in the metal plate winding body 32 is likely to be uneven. The distance between the metal plate winding bodies 22, 32 is thus preferably as short as possible.

Advantages of the present embodiment will now be described.

(1) The transformer unit 20 includes the first winding 51 and the second winding 71, which are located on the opposite sides of the metal plate winding bodies 22, 32 in the winding axis direction Z. This prevents the current density from locally increasing in the current density in the metal plate winding bodies 22, 32. Compared with a case in which the metal plate winding bodies 22, 32 is not located between the first winding 51 and the second winding 71, current is prevented from flowing in a concentrated manner in a part of the metal plate winding bodies 22, 32. This reduces the energy loss that occurs in the transformer unit 20.

(2) The first winding 51 and the second winding 71 respectively include the windings 52, 53 connected in parallel, and the windings 72, 73 connected in parallel. As compared with a case in which each of the first winding 51 and the second winding 71 includes a single winding, the area facing the metal plate winding bodies 22, 32 is increased. The increased facing area reduces the unevenness of the current density in the metal plate winding bodies 22, 32 with respect to the direction in which the windings 52, 53, 72, 73 are arranged.

The first winding 51 and the second winding 71 may each include a single winding and the width of the metal plate winding bodies 22, 32 may be reduced. Even in this case, it is possible to reduce the area of sections of the metal plate winding bodies 22, 32 that do not face the first winding 51 and the second winding 71. Accordingly, the unevenness in the current density in the metal plate winding bodies 22, 32 is reduced.

However, when the width of the metal plate winding bodies 22, 32 is reduced, the cross-sectional area of the metal plate winding bodies 22, 32 is reduced, and thus the resistance of the metal plate winding bodies 22, 32 is increased. Since the current flowing through the metal plate winding bodies 22, 32 is greater than the current flowing through the first winding 51 and the second winding 71, the energy loss increases if the width of the metal plate winding bodies 22, 32 is reduced. In contrast, when the facing area is increased by the multiple windings 52, 53, 72, 73 connected in parallel, it is not necessary to reduce the width of the metal plate winding bodies 22, 32, so that it is possible to suppress an increase in energy loss in the metal plate winding bodies 22, 32. In addition, the impedance of the first winding 51 and the second winding 71 is reduced by connecting the windings 52, 53, 72, 73 in parallel. Therefore, the energy loss in the first winding 51 and the second winding 71 is reduced.

(3) In order to reduce the unevenness of the current density in the metal plate winding bodies 22, 32, the two metal plate winding bodies 22, 32, the first winding 51, and the second winding 71 are brought into close contact with each other. More specifically, the two metal plate winding bodies 22, 32 are provided to be in contact with the insulating plate 120, the first winding 51 is provided to be in contact with the metal plate winding body 22, and the second winding 71 is provided to be in contact with the metal plate winding body 32. This enhances the magnetic coupling between the primary side coil 21 and the secondary side coil 50 and thus reduces the leakage inductance. Since the leakage inductance causes a surge voltage, the surge voltage is reduced by reducing the leakage inductance.

(4) The transformer unit 20 is used in the push-pull converter 12. The first winding 51 and the second winding 71 are on the opposite sides of the two metal plate winding bodies 22, 32. In the push-pull converter 12, current flows alternately through the two primary side coils 21, 31. The magnetic coupling may be enhanced by forming both the primary side coil 21, 31 and the secondary side coil 50 of insulated wires and winding the insulated wire around the core 90 in a sandwich type winding. However, in the push-pull converter 12, since current does not flow through the two primary side coils 21, 31 at the same time, the sandwich type winding is not effective. In contrast, the arrangement of the primary side coils 21, 31 and the secondary side coils 50 in the transformer unit 20 of the embodiment enhances the magnetic coupling between the primary side coil 21, 31 and the secondary side coil 50.

(5) The primary side coils 21, 31 include the metal plate winding bodies 22, 32. Since the metal plate winding bodies 22, 32 are wound bodies made of metal plates, the metal plate terminal portions 28, 29, 30, 38, 39, 40 can be provided by processing metal plates. When litz wires are used as the primary side coils 21, 31, it is necessary to separately provide metal terminals. This is because litz wires are formed by bundling multiple conductive wires, and thus it is difficult to process terminal portions. Since the metal plate winding bodies 22, 32 are used, the primary side coil 21, 31 can be mounted on the substrate without providing metal terminals. Similarly, an insulated wire that is a single wire is used for each of the first winding 51 and the second winding 71. The terminal portions 59, 60, 79, 80 can be provided by processing end portions of the insulated wires. Therefore, by using insulated wires, the secondary side coil 50 can be mounted on the substrate without providing metal terminals.

(6) The positional relationship between the metal plate winding bodies 22, 32, the first winding 51, and the second winding 71 reduces the unevenness of the current density in the metal plate winding bodies 22, 32. The unevenness of the current density in the metal plate winding bodies 22, 32 is reduced without using a special member, a special material, or a special production technique for reducing the unevenness of the current density in the metal plate winding bodies 22, 32.

The above-described embodiment may be modified as follows. The above-described embodiment and the following modifications can be implemented in combination if there is no technical contradiction.

The transformer unit 20 may be used in a power converter different from the push-pull type power conversion device. In this case, the transformer unit 20 may be configured to include a single metal plate winding body.

The transformer unit 20 may perform voltage step-down in accordance with the turns ratio between the primary side coil and the secondary side coil. The power input to the primary side coil is stepped down in voltage and output from the secondary side coil. In this case, the primary side coil includes a first winding and a second winding, and the secondary side coil includes a metal plate winding body. That is, one of the primary side coil and the secondary side coil may include the metal plate winding body, and the other of the primary side coil and the secondary side coil may include the first winding and the second winding having a greater number of turns than that of the metal plate winding.

Each of the first winding 51 and the second winding 71 may include a single winding. That is, the same configuration as that of the transformer unit 220 shown in FIG. 6 may be employed. Even in this case, unevenness of the current density with respect to the winding axis direction Z is reduced.

The number of turns of the primary side coils 21, 31 may be two or more. In this case, the number of windings of the metal plate winding bodies 22, 32 may be increased, or each of the primary side coils 21, 31 may include multiple metal plate winding bodies that are stacked with an insulating plate in between.

As the first winding 51 and the second winding 71, windings formed by winding metal plates may be used.

Figure 9:
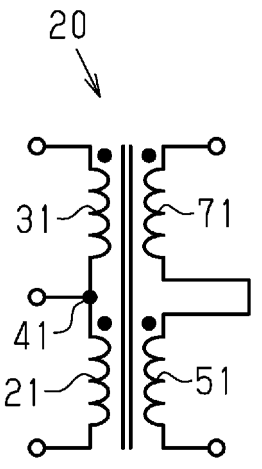
FIG. 9 is a circuit diagram showing a transformer unit according to a modification.

As shown in FIG. 9, the first winding 51 and the second winding 71 may be connected in series. The number of turns of the secondary side coil 50 is increased by connecting the first winding 51 and the second winding 71 in series. When the first winding 51 and the second winding 71 are connected in series, the number of turns of the secondary side coil 50 is a value obtained by adding the number of turns of the first winding 51 and the number of turns of the second winding 71. In the case of the above-described embodiment, the number of turns of the secondary side coil 50 is six, and the step-up ratio in the transformer unit 20 is doubled.

By changing how the terminal portions 59, 60 of the first winding 51 and the terminal portions 79, 80 of the second winding 71 are connected, it is possible to select whether to connect the first winding 51 and the second winding 71 in parallel or in series. Without changing the configuration of the transformer unit 20, the parallel connection and the series connection can be switched by changing the pattern of the substrate on which the transformer unit 20 is mounted so that it is possible to change whether the first winding 51 and the second winding 71 are connected in parallel or in series.

The push-pull power conversion device may be a push-pull type inverter. That is, the rectifier circuit 15 may be omitted from the embodiment, so that AC power is output.

The shapes of the first metal plate long side portion 24, the second metal plate long side portion 25, the first metal plate short side portion 26, and the second metal plate short side portion 27 may be changed. Similarly, the shapes of the first metal plate long side portion 34, the second metal plate long side portion 35, the first metal plate short side portion 36, and the second metal plate short side portion 37 may be changed.

The shapes of the metal plate terminal portions 28, 29, 30 may be changed. Similarly, the shapes of the metal plate terminal portions 38, 39, 40 may be changed.

The shapes of the terminal portions 59, 60 may be changed. Similarly, the shapes of the terminal portions 79, 80 may be changed.

In the present disclosure, the metal plate winding portions 23, 33, which include wound metal plates, may each include a metal plate punched out to form a loop, a metal plate wound to form a loop on one plane while bending an elongated metal plate, and a metal plate spirally wound while bending an elongated metal plate.

The invention claimed is:

1. A transformer unit, comprising a primary side coil and a secondary side coil that are arranged to face each other in a winding axis direction, wherein one of the primary side coil and the secondary side coil includes two metal plate winding bodies each formed of a wound metal plate, the other of the primary side coil and the secondary side coil includes a first winding and a second winding having a greater number of turns than the two metal plate winding bodies, each of the two metal plate winding bodies, the first winding, and the second winding is wound around a winding axis extending in the winding axis direction, the first winding and the second winding are insulated windings, the first winding and the second winding are separated from one another, the first winding and the second winding are disposed on opposite sides of the two metal plate winding bodies in the winding axis direction, and the first winding contacts one of the two metal plate winding bodies and the second winding contacts the other of the two metal plate winding bodies.

2. The transformer unit according to claim 1, wherein each of the first winding and the second winding includes multiple windings that are connected in parallel.

3. The transformer unit according to claim 1, wherein the transformer unit is configured to be used in a push-pull power conversion device, and the first winding and the second winding are disposed on opposite sides of both of the two metal plate winding bodies in the winding axis direction.

4. The transformer unit according to claim 1, wherein the first winding includes a plurality of turns and the second winding includes a plurality of turns, all the turns of the first and second windings are wound and aligned in a direction perpendicular to the winding axis direction.

* * * * *